United States Patent
Mimura

(10) Patent No.: US 6,873,074 B2
(45) Date of Patent: Mar. 29, 2005

(54) TERMINAL CONNECTION STRUCTURE OF A RESOLVER STATOR COIL

(75) Inventor: Hisashi Mimura, Nagano-ken (JP)

(73) Assignee: Tamagawa Seiki Kabushiki Kaisha, Nagano-Ken (JP)

( * ) Notice: Subject to any disclaimer, the term of this patent is extended or adjusted under 35 U.S.C. 154(b) by 0 days.

(21) Appl. No.: 10/179,849

(22) Filed: Jun. 26, 2002

(65) Prior Publication Data

US 2003/0006657 A1 Jan. 9, 2003

(30) Foreign Application Priority Data

Jul. 5, 2001 (JP) .......................................... 2001-205257

(51) Int. Cl.⁷ ............................................... H02K 5/22
(52) U.S. Cl. ............................................................ 310/71
(58) Field of Search ........................... 310/71, 254, 194

(56) References Cited

U.S. PATENT DOCUMENTS

| 5,004,941 | A | * | 4/1991 | Ohzeki et al. ............. 310/49 R |
| 5,912,517 | A | * | 6/1999 | Nishimura et al. ............ 310/71 |
| 6,028,383 | A | * | 2/2000 | Ohshita ....................... 310/71 |

FOREIGN PATENT DOCUMENTS

| CN | 1221157 A | 6/1999 | |
| CN | 1223495 A | 7/1999 | |
| EP | 917273 A2 | 5/1999 | ............ H02K/3/50 |
| JP | 58-91606 A | 5/1983 | ............ H02K/3/50 |
| JP | 5-83895 A | 4/1993 | ............ H02K/3/50 |
| JP | 9-19103 A | 1/1997 | ............ H02K/5/22 |
| JP | 10-174339 A | 6/1998 | ............ H02K/3/50 |

OTHER PUBLICATIONS

Patent Abstracts of Japan, vol. 007, No. 186, Aug. 16, 1983.

* cited by examiner

*Primary Examiner*—Burton S. Mullins
*Assistant Examiner*—Nguyen N Hanh
(74) *Attorney, Agent, or Firm*—Sughrue Mion, PLLC

(57) ABSTRACT

Disclosed is a terminal connection structure of a resolver stator coil in which a part of the end portion of the stator coil is left as a free end portion which is free with respect to the terminals, whereby external impact is absorbed, and rupture of the stator coil is prevented, thereby achieving an improvement in reliability. An end portion (3) of a stator coil (1) is wound around terminals (4) to form a winding connection portion (5), and a part of the end portion (3) is left as a free end portion (30) which is not integrally connected to the terminals (4) by soldering or fusing, whereby a spring function is obtained.

7 Claims, 8 Drawing Sheets

TERMINAL CONNECTION STRUCTURE OF A RESOLVER STATOR COIL

BACKGROUND OF THE INVENTION

1. Field of the Invention

The present invention relates to a terminal connection structure of a resolver stator coil. In particular, the present invention relates to a novel and improved connection structure in which a part of an end portion of a stator coil wound around a terminal is left as a free end without integrating it with the terminal by soldering or the like, whereby any expansion/contraction caused by a temperature change or a vibration generated in the stator coil is absorbed by this free end, and rupture or breakage of the stator coil is prevented, thereby improving the resolver in terms of reliability.

2. Description of the Related Art

FIGS. 5 and 7 show a typical conventional connection structure of the stator coil of the resolver of this type.

In FIG. 5, reference numeral 1 indicates a stator coil provided on a resolver stator 2. An end portion 3 of this stator coil 1 is wound around a terminal 4 protruding from an insulation mold 10 provided on the stator 2, to which varnish coating or the like is applied.

The end portion 3 wound around the terminal 4 constitutes a winding connecting portion 5, which is entirely covered with solder 6, as shown in FIG. 7. By means of this solder 6, the end portion 3 is connected with the terminal 4 so as to form an integral portion.

In addition to the soldering, fusing is also performed to form the integral connection between the end portion 3 and the terminal 4. In this case, the end portion 3 of the stator coil 1 is fused by heating to form the integral connection with the terminal 4.

The conventional terminal connection structure of the resolver stator coil is constructed as described above, thereby involving the following problem.

Soldering is performed entirely to the end portion wound around the terminal as shown in FIG. 7. Therefore, when the resolver is manufactured in the state shown in FIG. 7, and then is mounted to an automobile, machine tool, etc. for operation, stress caused by thermal expansion, vibration, etc. is applied to various portions of the stator. As a result, as shown in FIG. 8, this stress causes the stator coil to be broken and cut down from the terminal, i.e., a base 1a of the soldered portion thereof, and the resolver ceases to operate as such.

The base portion 1a is fixed by soldering or the like, any vibration or expansion/contraction of the stator coil is hard to absorb, resulting in breakage of the end portion 3.

SUMMARY OF THE INVENTION

The present invention has been made in view of solving the above-mentioned problem. An object of the present invention is to provide a terminal connection structure of a resolver stator coil in which a part of an end portion of a stator coil wound around a terminal is used as a free without integrating it with the terminal by soldering or the like, whereby any expansion/contraction caused by a temperature change or a vibration generated in the stator coil is absorbed by this free end, and rupture or breakage of the stator coil is prevented, thereby improving the resolver in terms of reliability.

A terminal connection structure of a resolver stator coil according to the present invention includes a resolver stator, a stator coil wound around each magnetic pole tooth of the stator through the intermediation of annular insulation caps, and a winding connection portion formed by winding an end portion of the stator coil around a plurality of terminals provided in a peripheral edge portion of the insulation cap, the stator coil and the terminals being integrally connected to the winding connection portion by soldering or fusing, in which a part of the end portion wound around the winding connection portion is left as a free end portion which is not integrally connected to the terminals by the soldering or fusing.

Also, in the terminal connection structure of a resolver stator coil, the free end portion is wound at least one time around the terminals.

Also, in the terminal connection structure of a resolver stator coil, the free end portion is wound at least a plurality of times around the terminals.

Also, in the terminal connection structure of a resolver stator coil, the free end portion has a spring function and a sagging function.

DESCRIPTION OF THE PREFERRED EMBODIMENT

Figure 1:
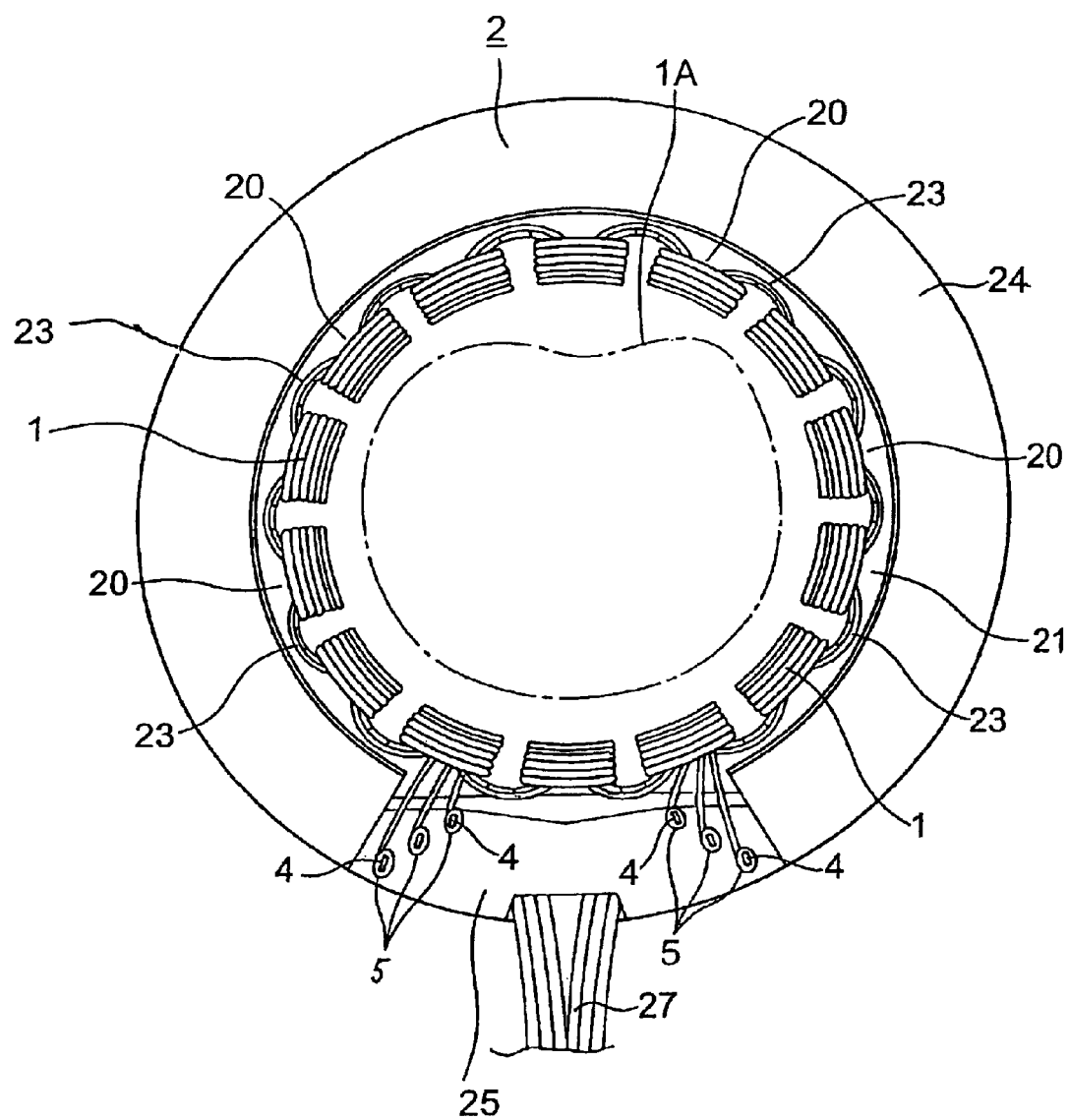
FIG. 1 is a plan view showing a terminal connection structure of a resolver stator according to the present invention.

A preferred embodiment of a terminal connection structure of a resolver stator coil in accordance with the present invention will now be described with reference to the drawings. Components the same as or equivalent to those of the conventional structure will be indicated by the same reference numerals.

Figure 2:
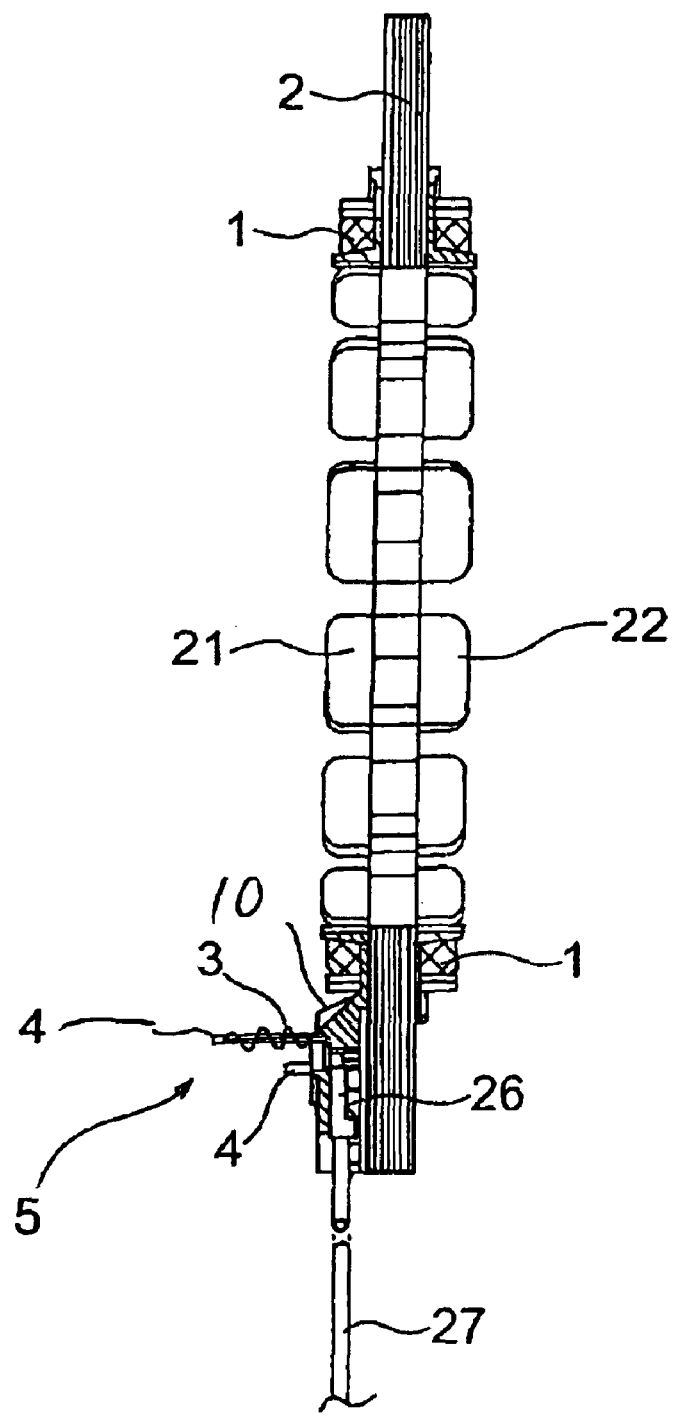
FIG. 2 is a sectional view of FIG. 1.
Figure 3:
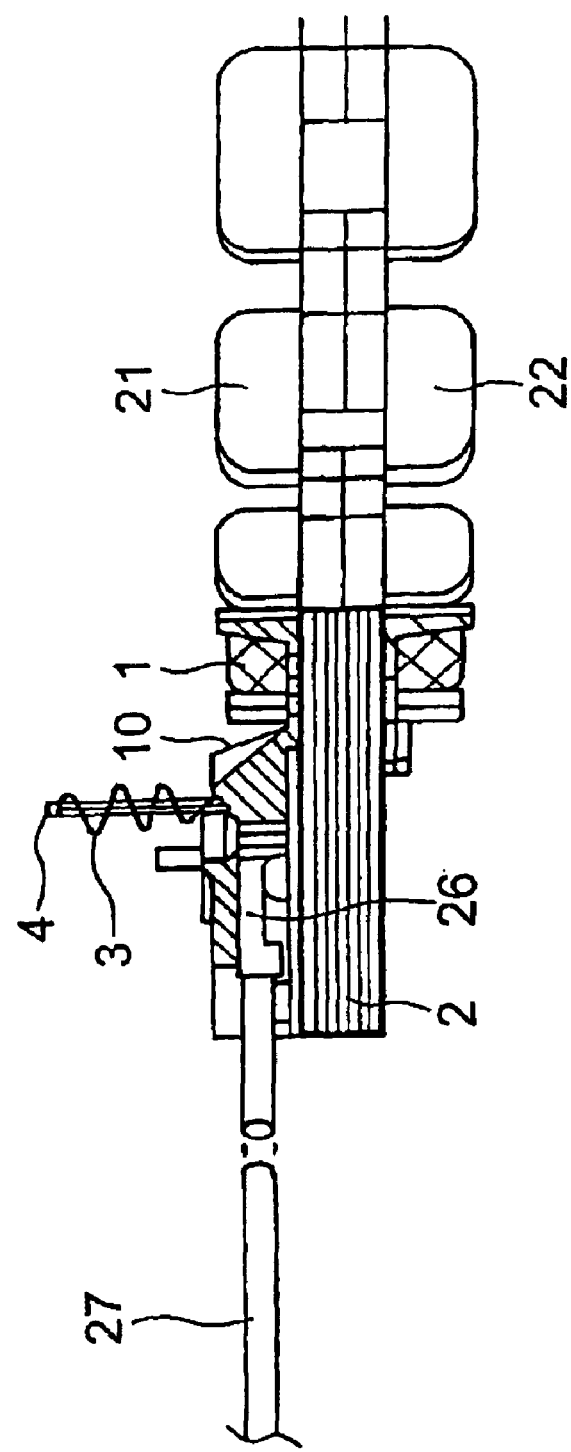
FIG. 3 is an enlarged sectional view of a main portion of FIG. 2.

In FIGS. 1 and 2, reference numeral 1 indicates a resolver stator coil. This stator coil 1 is wound around magnetic pole teeth 20 of a stator 2 in which a rotor 1A is arranged and which is formed of an iron core, through an intermediation of a pair of annular caps 21 and 22. The stator coil 1 is connected in series to the magnetic pole teeth 20 through crossovers 23.

In a part of the outer peripheral edge 24 of the stator 2, there is arranged a peripheral edge portion 25 which is formed so as to radially protrude in a part of one of the insulating caps 21 and 22. Terminals 4 are planted to stand in this peripheral edge portion 25.

The terminals 4 are formed integrally with a base portion 26, and the terminals 4 and the base portion 26 form an L-shaped configuration. Lead wires 27 are connected to the base portion 26, and the terminals 4 are arranged so as to extend through holes (not shown) of the peripheral edge portion 25 and protrude outwardly.

An insulation mold 10 is formed on the surface of the peripheral edge portion 25, to which varnish coating, potting or the like is applied. By means of this insulation mold 10, the terminals 4 are secured in position as shown in FIG. 5, etc.

Figure 4:
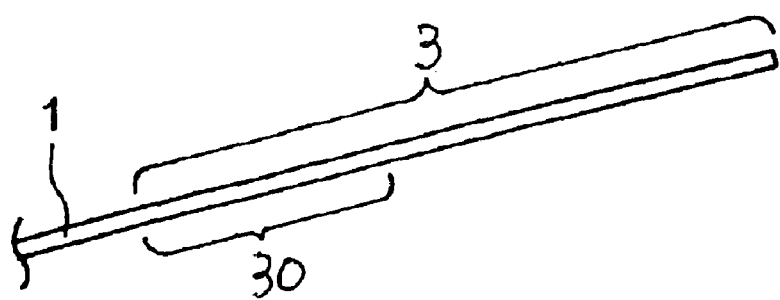
FIG. 4 is an enlarged view of the stator coil of FIG. 1.
Figure 5:
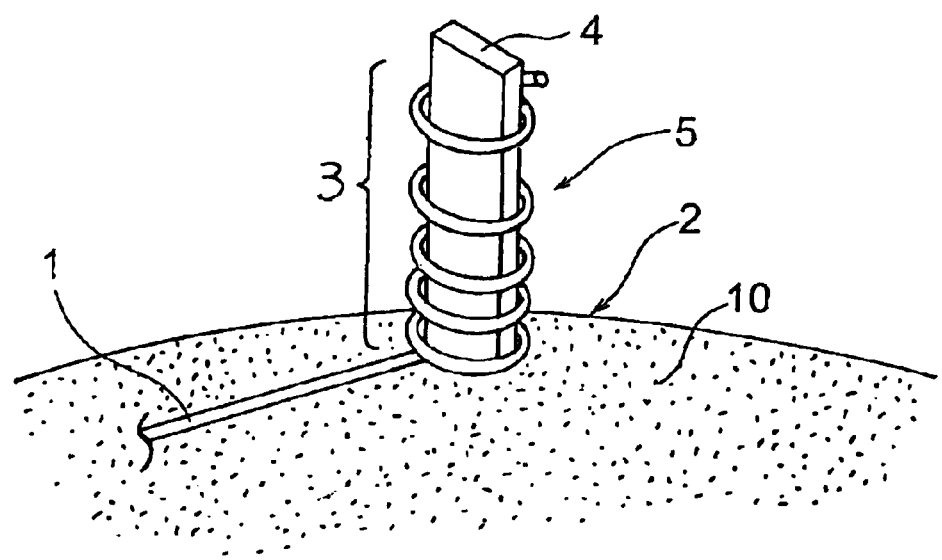
FIG. 5 is a perspective view showing a stator coil winding and connecting portion in accordance with the present invention and the prior art.

As shown in FIGS. 4 and 5, the end portion 3 consists of a portion near the end after winding the stator coil 1 around the magnetic pole teeth 20. The end portion 3 wound around the outer periphery of the terminal 4 a plurality of times forms the winding connection portion 5 with the terminal 4.

Figure 6:
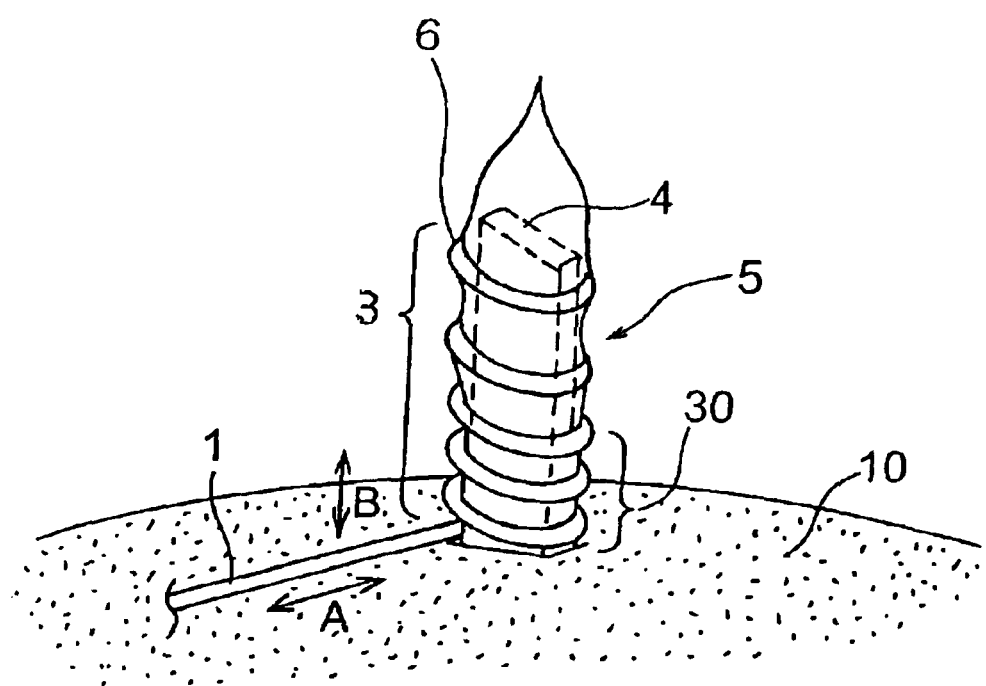
FIG. 6 is a perspective view showing a main portion of FIG. 1.
Figure 7:
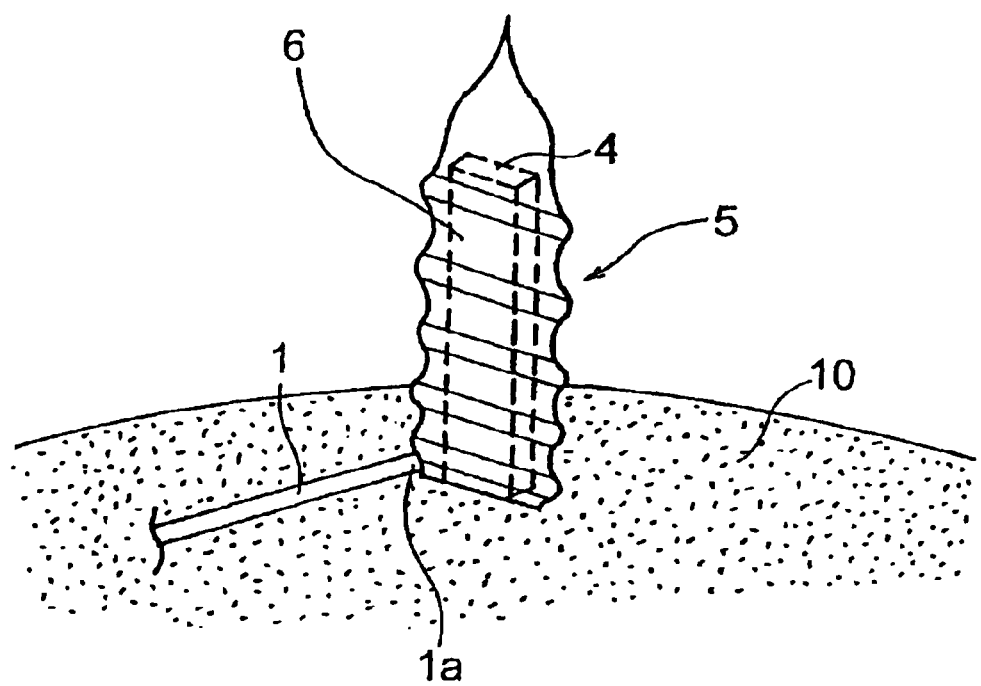
FIG. 7 is a perspective view showing a conventional winding and connecting portion.
Figure 8:
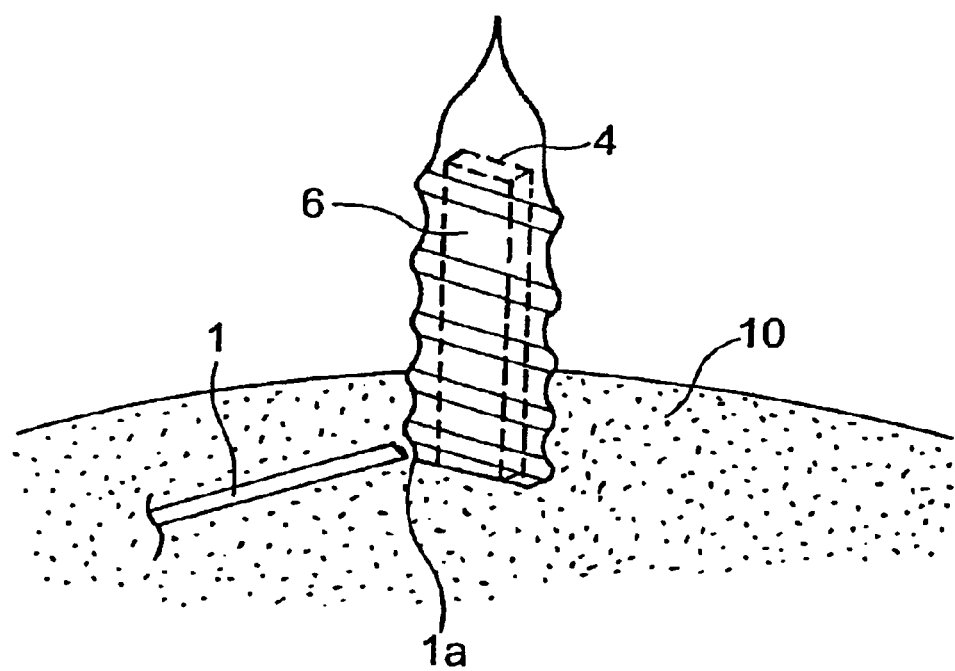
FIG. 8 is a perspective view showing how rupture occurs in the winding and connecting portion of FIG. 7.

The winding connection portion 5 as a whole, that is, the terminal 4 as a whole is not integrated by soldering 6 or the like. As in the prior art example shown in FIG. 7, as shown in FIG. 6, the end portion 3 and the terminal 4 are formed into one by soldering 6 (or fusing) while leaving a plurality of turns of the lower portion which is a part of the end portion 3 wound around the terminal 4. The rest constitutes a free end portion 30 capable of independently operating without being integrated with the terminal 4.

The free end portion 30 is wound around the outer periphery of the terminal 4 a plurality of times, so that it functions like a spring. If the stator coil 1 expands/contracts in the directions of an arrow A due to thermal expansion, or when vibration in the directions of the arrow A and vibration in the directions of the arrows B perpendicular thereto occur due to vibration from outside, most of the expansion/contraction and vibration can be absorbed by the spring function and sagging function of the free end portion 30, whereby it is possible to prevent rupture or the like of the end portion 3.

While in the above-described construction the free end portion 30 is wound around the terminal 4 a plurality of times, the above-mentioned spring function can be obtained by winding the free end portion at least one time or even less than that, e.g., by 300 degrees, 250 degrees, etc.

The terminal connection structure of the resolver stator coil in accordance with the present invention, constructed as described above, provides the following advantage.

Instead of integrally fixing the entire end portion wound around the stator coil terminal, a part of it is left as a free end portion that is not wound around the terminal so that a spring function and sagging function may be obtained, the remaining portion being integrally fixed. Thus, if vibration is applied from outside or expansion/contraction or the like occurs due to thermal expansion, the vibration, etc. can be absorbed by the spring function and sagging function, whereby it is possible to prevent breakage such as rupture as in the prior art, thereby improving the resolver in terms of reliability.

What is claimed is:

1. A terminal connection structure of a resolver stator coil comprising a resolver stator, a stator coil wound around each magnetic pole tooth of said stator through the intermediation of annular insulation caps, and a winding and connection portion formed by winding an end portion of said stator coil around a plurality of terminals provided in a peripheral edge portion of said insulation cap, said stator coil and said terminals being integrally connected to said winding and connection portion by one of soldering and fusing, wherein a part of said end portion wound around said winding connection portion is left as a free end portion which is not integrally connected to said terminals by said soldering or fusing, and further wherein said terminals are disposed so that in cross-section a peripheral portion of at least one of the terminals extends along or parallel to a radial direction of said resolver stator.

2. A terminal connection structure of a resolver stator coil according to claim 1, wherein said free end portion is wound at least one time around said terminals.

3. A terminal connection structure of a resolver stator coil according to claim 1, wherein said free end portion is wound at least a plurality of times around said terminals.

4. A terminal connection structure of a resolver stator coil according to claim 1, wherein said free end portion has a spring function and a sagging function.

5. A terminal connection structure of a resolver stator coil comprising a resolver stator, a stator coil wound around each magnetic pole tooth of said stator through the intermediation of annular insulation caps, and a winding and connection portion formed by winding an end portion of said stator coil around a plurality of terminals provided in a peripheral edge portion of said insulation cap, said stator coil and said terminals being integrally connected to said winding and connection portion by one of soldering and fusing, and means for preventing breakage of said stator coil, said means for preventing breakage being disposed in said end portion and adjacent to said stator coil, wherein said terminals are disposed so that in cross-section a peripheral portion of at least one of the terminals extends along or parallel to a radial direction of said resolver stator.

6. A terminal connection structure of a resolver stator coil according to claim 5, wherein said at least one of the terminals is rectangular in cross-section and is disposed so that a long side of the rectangle extends along or parallel to the radial direction of said resolver stator.

7. A terminal connection structure of a resolver stator coil according to claim 1, wherein said at least one of the terminals is rectangular in cross-section and is disposed so that a long side of the rectangle extends along or parallel to the radial direction of said resolver stator.

* * * * *